United States Patent
Oba et al.

(10) Patent No.: US 8,610,030 B2
(45) Date of Patent: Dec. 17, 2013

(54) LASER BEAM PROCESSING MACHINE

(75) Inventors: Ryugo Oba, Tokyo (JP); Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 1560 days.

(21) Appl. No.: 11/783,190

(22) Filed: Apr. 6, 2007

(65) Prior Publication Data

US 2007/0235430 A1 Oct. 11, 2007

(30) Foreign Application Priority Data

Apr. 10, 2006 (JP) .................................. 2006-107802

(51) Int. Cl.
*B23K 26/02* (2006.01)

(52) U.S. Cl.
USPC .............. 219/121.83; 219/121.82; 219/121.6; 219/121.61; 219/121.62; 219/121.67; 219/121.72; 359/205.1; 359/196.1; 359/198.1; 359/384; 438/463

(58) Field of Classification Search
CPC ........... B23K 26/0736; B23K 26/0853; B23K 26/03; B23K 26/06
USPC ................. 369/112.2, 121; 359/205.1, 196.1, 359/198.1, 384; 372/67; 219/121.61, 219/121.82, 121.83, 121.28, 121.6, 121.62, 219/121.67, 121.72; 438/463; 257/E21.347, 257/E21.599
See application file for complete search history.

(56) References Cited

U.S. PATENT DOCUMENTS

| | | | | |
|---|---|---|---|---|
| 3,850,515 | A | * | 11/1974 | Burch ............................ 353/102 |
| 4,461,947 | A | * | 7/1984 | Ward ........................ 219/121.84 |
| 4,650,524 | A | * | 3/1987 | Kiyama et al. ................... 438/61 |

(Continued)

FOREIGN PATENT DOCUMENTS

| | | |
|---|---|---|
| JP | 2-137687 | 5/1990 |
| JP | 2005-021940 | 1/2005 |
| JP | 2005-251882 | 9/2005 |
| JP | 2006-51517 | 2/2006 |

OTHER PUBLICATIONS

Japanese Office Action issued on May 31, 2011 for Application No. 2006-107802.

*Primary Examiner* — Henry Yuen
*Assistant Examiner* — Brett Spurlock
(74) *Attorney, Agent, or Firm* — Smith, Gambrell & Russell, LLP (57) ABSTRACT

A laser beam processing machine comprising a laser beam application means for applying a laser beam to a workpiece held on a chuck table, a processing-feed means, an indexing-feed means, a processing-feed amount detection means for detecting the amount of feed, an indexing-feed amount detection means, and a control means, wherein the condenser constituting the laser beam application means comprises an elliptic spot forming means for forming a focal spot into an elliptic shape and a focal spot turning means for turning the elliptic focal spot on an optical axis at the center thereof; and the control means comprises a storage means for storing the X, Y coordinate values of a processing line formed on the workpiece, obtains the X, Y coordinate values of the current position of a laser beam application position based on detection signals from the processing-feed amount detection means and the indexing-feed amount detection means, and controls the focal spot turning means to ensure that the long axis of the focal spot should follow along the processing line based on the X, Y coordinate values of the detected current position and the X, Y coordinate values of the processing line stored in the storage means.

2 Claims, 10 Drawing Sheets

(56) References Cited

U.S. PATENT DOCUMENTS

| | | | |
|---|---|---|---|
| 4,734,550 A * | 3/1988 | Imamura et al. | 219/121.77 |
| 5,120,926 A * | 6/1992 | Marriott | 219/121.67 |
| 5,124,522 A * | 6/1992 | Booke et al. | 219/121.19 |
| 6,422,082 B1 * | 7/2002 | Suh | 73/624 |
| 6,559,411 B2 * | 5/2003 | Borgeson et al. | 219/121.69 |
| 6,876,946 B2 * | 4/2005 | Yasuda et al. | 702/152 |
| 6,881,926 B2 * | 4/2005 | Ohtomo et al. | 219/121.73 |
| 2003/0003690 A1 * | 1/2003 | Nering et al. | 438/463 |
| 2003/0047538 A1 * | 3/2003 | Trpkovski | 216/84 |
| 2003/0075531 A1 * | 4/2003 | Kupisiewicz | 219/121.69 |
| 2005/0007906 A1 * | 1/2005 | Horinouchi et al. | 369/44.37 |
| 2005/0111339 A1 * | 5/2005 | Tanaka | 369/121 |
| 2005/0133485 A1 * | 6/2005 | Tokura | 219/121.6 |
| 2005/0145605 A1 * | 7/2005 | Faour et al. | 219/121.7 |
| 2005/0205531 A1 * | 9/2005 | Iizuka | 219/121.18 |
| 2006/0000812 A1 * | 1/2006 | Weber et al. | 219/121.61 |
| 2006/0022008 A1 * | 2/2006 | Brown et al. | 225/1 |
| 2006/0040473 A1 * | 2/2006 | Fukuyo et al. | 438/463 |
| 2006/0108339 A1 * | 5/2006 | Nishiwaki et al. | 219/121.72 |
| 2006/0119691 A1 * | 6/2006 | Shigematsu et al. | 347/131 |
| 2007/0057184 A1 * | 3/2007 | Uto et al. | 250/310 |
| 2007/0084838 A1 * | 4/2007 | Hsu | 219/121.72 |
| 2007/0104234 A1 * | 5/2007 | Chen | 372/38.01 |
| 2007/0119831 A1 * | 5/2007 | Kandt | 219/121.67 |
| 2007/0228020 A1 * | 10/2007 | Oba | 219/121.6 |
| 2008/0031103 A1 * | 2/2008 | Horinouchi et al. | 369/44.37 |
| 2008/0237189 A1 * | 10/2008 | Grunewald et al. | 216/94 |
| 2009/0166340 A1 * | 7/2009 | Arai et al. | 219/121.7 |

* cited by examiner

LASER BEAM PROCESSING MACHINE

FIELD OF THE INVENTION

The present invention relates to a laser beam processing machine for carrying out laser processing of a workpiece and, more specifically, to a laser beam processing machine capable of processing along a curved line even when the shape of the focal spot of a laser beam is elliptic.

DESCRIPTION OF THE PRIOR ART

In recent years, a laser beam processing machine has been used as an apparatus for dividing a workpiece such as a semiconductor wafer or a glass plate, along a predetermined processing line. This laser beam processing machine is constituted by a chuck table for holding a workpiece, a laser beam application means for applying a laser beam to the workpiece held on the chuck table, a processing-feed means for moving the chuck table and the laser beam application means relative to each other in a processing-feed direction, and an indexing-feed means for moving the chuck table and the laser beam application means relative to each other in an indexing-feed direction perpendicular to the processing-feed direction as disclosed by JP-A 2005-21940.

The above laser beam processing machine can carry out laser processing along a complex processing line including not only a straight line but also a curved line by adjusting the above processing-feed means and indexing-feed means when the shape of the focal spot of a laser beam applied from the laser beam application means is circular.

Meanwhile, a laser processing method for carrying out laser processing by forming the elliptic focal spot of a laser beam in order to improve processing characteristics is disclosed by JP-A 2006-51517.

To carry out laser processing by forming the elliptic focal spot of a laser beam, the long axis of the focal spot of the laser beam must be irradiated along a processing line. When the processing line is curved, however, there is a problem that it is difficult to change the direction of the elliptic focal spot to ensure that its long axis should follow along the processing line, even by controlling the above processing-feed means and indexing-feed means.

SUMMARY OF THE INVENTION

It is an object of the present invention to provide a laser beam processing machine capable of applying the long axis of a focal spot along a curved processing line even when the shape of the focal spot of a laser beam is elliptic.

To attain the above object, according to the present invention, there is provided a laser beam processing machine comprising a chuck table for holding a workpiece, a laser beam application means for applying a laser beam to the workpiece held on the chuck table, a processing-feed means for moving the chuck table and the laser beam application means relative to each other in a processing-feed direction (X-axis direction), an indexing-feed means for moving the chuck table and the laser beam application means relative to each other in an indexing-feed direction (Y-axis direction) perpendicular to the processing-feed direction (X-axis direction), a processing-feed amount detection means for detecting the processing-feed amount fed by the processing-feed means, an indexing-feed amount detection means for detecting the indexing-feed amount fed by the indexing-feed means, and a control means for controlling the laser beam application means, the processing-feed means and the indexing-feed means based on detection signals from the processing-feed amount detection means and the indexing-feed amount detection means, wherein the laser beam application means comprises a laser beam oscillating means for oscillating a laser beam and a condenser for converging the laser beam oscillated by the laser beam oscillating means, and the condenser comprises an elliptic spot forming means for forming a focal spot into an elliptic shape and a focal spot turning means for turning the elliptic focal spot formed by the elliptic spot forming means on an optical axis at the center thereof; and the control means comprises a storage means for storing the X, Y coordinate values of a processing line formed on the workpiece, obtains the X, Y coordinate values of the current position of a laser beam application position based on detection signals from the processing-feed amount detection means and the indexing-feed amount detection means, and controls the focal spot turning means to ensure that the long axis of the focal spot should follow along the processing line based on the X, Y coordinate values of the detected current position and the X, Y coordinate values of the processing line stored in the storage means.

When the X, Y coordinate values of the currant position of the laser beam application position are (x1, y1) and the coordinate values of the next to-be-processed position are (x2, y2), the control means obtains an inclination ($\theta$) with respect to the X-axis direction from the current position to the next to-be-processed position based on the equation $\theta=(y1-y2)/(x1-x2)$ and controls the focal spot turning means to ensure that the long axis of the focal spot should coincide with the inclination ($\theta$) with respect to the X-axis direction.

Since in the laser beam processing machine in the illustrated embodiment, the focal spot turning means is controlled to ensure that the long axis of the focal spot should follow along the processing line based on the X, Y coordinate values of the current position of the laser beam application position and the X, Y coordinate values of the processing line formed on the workpiece stored in the storage means, even when the processing line is curved, grooves having a width corresponding to the short axis of the focal spot can be formed along the processing line in the workpiece W.

DETAILED DESCRIPTION OF THE PREFERRED EMBODIMENTS

The laser beam processing machine constituted according to the present invention will be described in more detail hereinunder with reference to the accompanying drawings.

Figure 1:
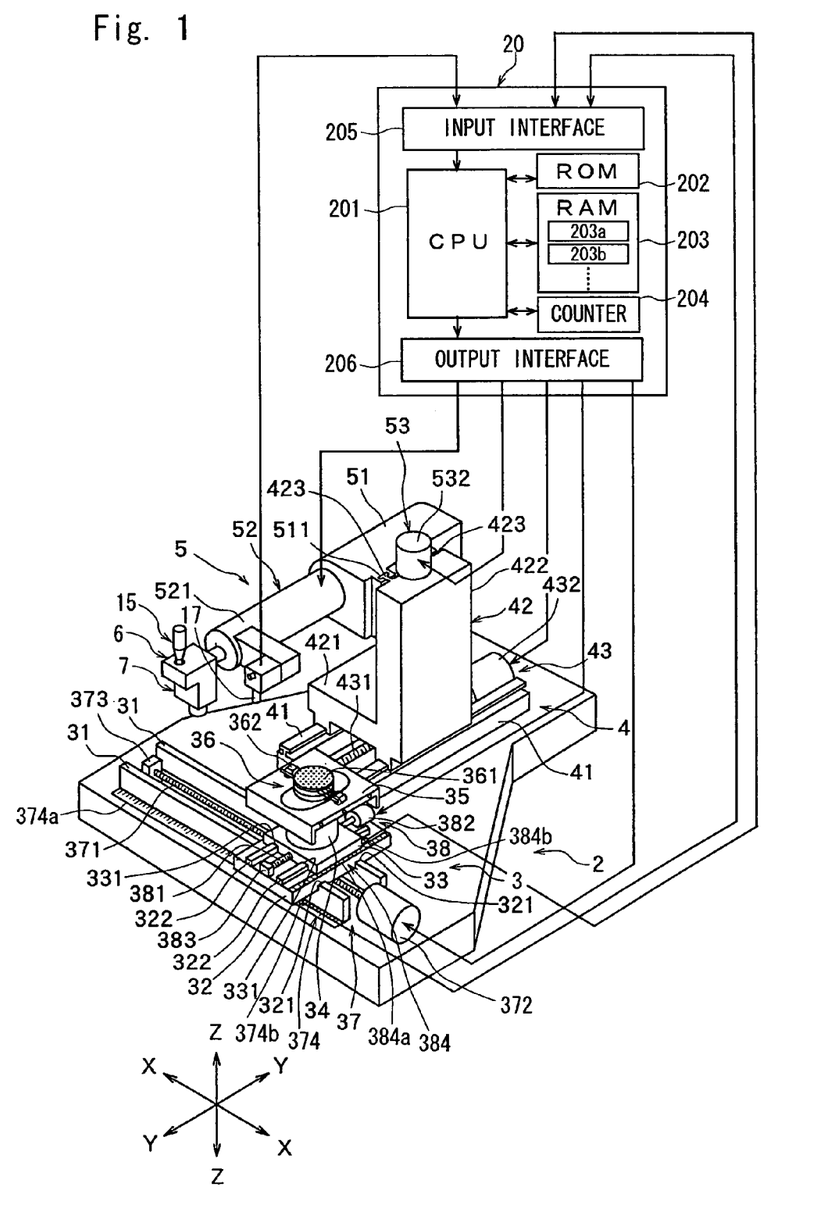
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction (X-axis direction) indicated by an arrow X, a laser beam application unit support mechanism 4 mounted on the stationary base 2 in such a manner that it can move in an indexing-feed direction (Y-axis direction) indicated by an arrow Y perpendicular to the direction (X-axis direction) indicated by the arrow X, and a laser beam application unit 5 mounted on the laser beam application unit support mechanism 4 in such a manner that it can move in a direction (Z-axis direction) indicated by an arrow Z.

The above chuck table mechanism 3 comprises a pair of guide rails 31 and 31, which are mounted on the stationary base 2 and arranged parallel to each other in the processing-feed direction (X-axis direction) indicated by the arrow X, a first sliding block 32 mounted on the guide rails 31 and 31 in such a manner that it can move in the processing-feed direction (X-axis direction) indicated by the arrow X, a second sliding block 33 mounted on the first sliding block 32 in such a manner that it can move in the indexing-feed direction (Y-axis direction) indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 by a suction means that is not shown. The chuck table 36 is provided with clamps 362 for fixing an annular frame which will be described later.

The above first sliding block 32 has, on its undersurface, a pair of to-be-guided grooves 321 and 321 to be fitted to the above pair of guide rails 31 and 31 and has, on its top surface, a pair of guide rails 322 and 322 formed parallel to each other in the indexing-feed direction (Y-axis direction) indicated by the arrow Y. The first sliding block 32 constituted as described above can move along the pair of guide rails 31 and 31 in the processing-feed direction (X-axis direction) indicated by the arrow X by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction (X-axis direction) indicated by the arrow X. The processing-feed means 37 comprises a male screw rod 371 arranged between the above pair of guide rails 31 and 31 parallel thereto and a drive source such as a pulse motor 372 for rotary-driving the male screw rod 371. The male screw rod 371 is, at its one end, rotatably supported to a bearing block 373 fixed to the above stationary base 2 and is, at the other end, transmission-couple to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction (X-axis direction) indicated by the arrow X.

The laser beam processing machine in the illustrated embodiment comprises a processing-feed amount detection means 374 for detecting the processing-feed amount of the above chuck table 36. The processing-feed amount detection means 374 comprises a linear scale 374a arranged along the guide rail 31 and a read head 374b which is mounted on the first sliding block 32 and moves along the linear scale 374a together with the first sliding block 32. The read head 374b of this processing-feed amount detection means 374 supplies one pulse signal for every 1 μm to a control means which will be described later in the illustrated embodiment. The control means described later detects the processing-feed amount of the chuck table 36 by counting the input pulse signals. When the pulse motor 372 is used as a drive source for the above processing-feed means 37, the processing-feed amount of the chuck table 36 can be detected by counting the drive pulses of the control means described later for outputting a drive signal to the pulse motor 372. When a servo motor is used as a drive source for the above processing-feed means 37, the processing-feed amount of the chuck table 36 can be detected by counting pulse signals input into the control means described later from a rotary encoder for detecting the revolution of the servo motor.

The above second sliding block 33 has, on its undersurface, a pair of to-be-guided grooves 331 and 331 to be fitted to the pair of guide rails 322 and 322 formed on the top surface of the above first sliding block 32 and can move in the indexing-feed direction (Y-axis direction) indicated by the arrow Y by fitting the to-be-guided grooves 331 and 331 to the pair of guide rails 322 and 322, respectively. The chuck table mechanism 3 in the illustrated embodiment comprises a first indexing-feed means 38 for moving the second sliding block 33 along the pair of guide rails 322 and 322 on the first sliding block 32 in the indexing-feed direction (Y-axis direction) indicated by the arrow Y. The first indexing-feed means 38 comprises a male screw rod 381 which is arranged between the above pair of guide rails 322 and 322 parallel thereto, and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction (Y-axis direction) indicated by the arrow Y.

The laser beam processing machine in the illustrated embodiment comprises an indexing-feed amount detection means 384 for detecting the indexing-feed amount of the above second sliding block 33. This indexing-feed amount detection means 384 comprises a linear scale 384a arranged along the guide rail 322 and a read head 384b which is mounted on the second sliding block 33 and moves along the linear scale 384a together with the second sliding block 33. The read head 384b of the indexing-feed amount detection means 384 supplies one pulse signal for every 1 μm to the control means described later, in the illustrated embodiment. The control means described later detects the indexing-feed amount of the chuck table 36 by counting the input pulse signals. When the pulse motor 382 is used as a drive source for the above first indexing-feed means 38, the indexing-feed amount of the chuck table 36 can be detected by counting the drive pulses of the control means described later for outputting a drive signal to the pulse motor 382. When a servo motor is used as a drive source for the above first indexing-feed means 38, the indexing-feed amount of the chuck table 36 can be detected by counting pulse signals input into the control means described later from a rotary encoder for detecting the revolution of the servo motor.

The above laser beam application unit support mechanism 4 comprises a pair of guide rails 41 and 41 which are mounted on the stationary base 2 and arranged parallel to each other in the indexing-feed direction (Y-axis direction) indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction (Z-axis direction) indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction (Y-axis direction) indicated by the arrow Y. This second indexing-feed means 43 comprises a male screw rod 431 arranged between the above pair of guide rails 41 and 41 parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction (Y-axis direction) indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction (Z-axis direction) indicated by the arrow Z by fitting the to-be-guided grooves 511 and 511 to the above guide rails 423 and 423, respectively.

The laser beam application unit 5 in the illustrated embodiment comprises a moving means 53 for moving the unit holder 51 along the pair of guide rails 423 and 423 in the direction (Z-axis direction) indicated by the arrow Z. The moving means 53 comprises a male screw rod (not shown) arranged between the above pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction (Z-axis direction) indicated by the arrow Z. In the illustrated embodiment, the laser beam application means 52 is moved up by driving the pulse motor 532 in a normal direction and moved down by driving the pulse motor 532 in the reverse direction.

Figure 2:
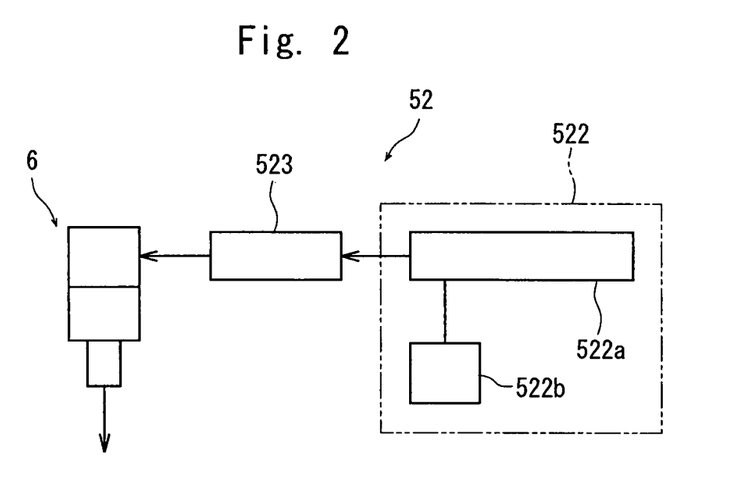
FIG. 2 is a constituent block diagram of laser beam application means provided in the laser beam processing machine shown in FIG. 1.

The illustrated laser beam application means 52 has a cylindrical casing 521 that is secured to the above unit holder 51 and extends substantially horizontally. The laser beam application means 52 comprises a pulse laser beam oscillation means 522 and a transmission optical system 523 installed in the casing 521 as shown in FIG. 2 and a processing head 6 for applying a pulse laser beam oscillated by the pulse laser beam oscillation means 522 to the workpiece held on the above chuck table 36, which is attached to the end of the casing 521. The above pulse laser beam oscillation means 522 is constituted by a pulse laser beam oscillator 522a composed of a YAG laser oscillator or YVO4 laser oscillator and a repetition frequency setting means 522b connected to the pulse laser beam oscillator 522a. The transmission optical system 523 has suitable optical elements such as a beam splitter, etc.

Figure 3:
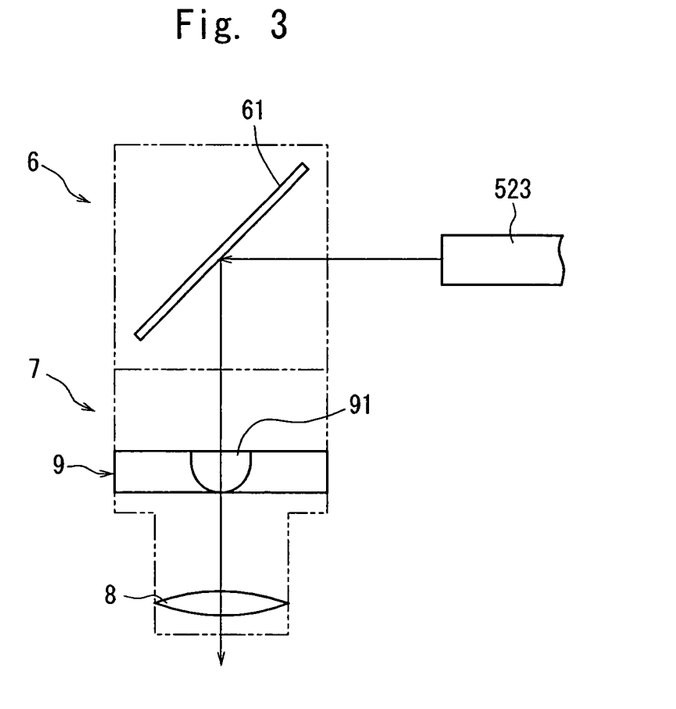
FIG. 3 is an explanatory diagram of a processing head comprising a condenser constituting the laser beam application means shown in FIG. 2.
Figure 4:
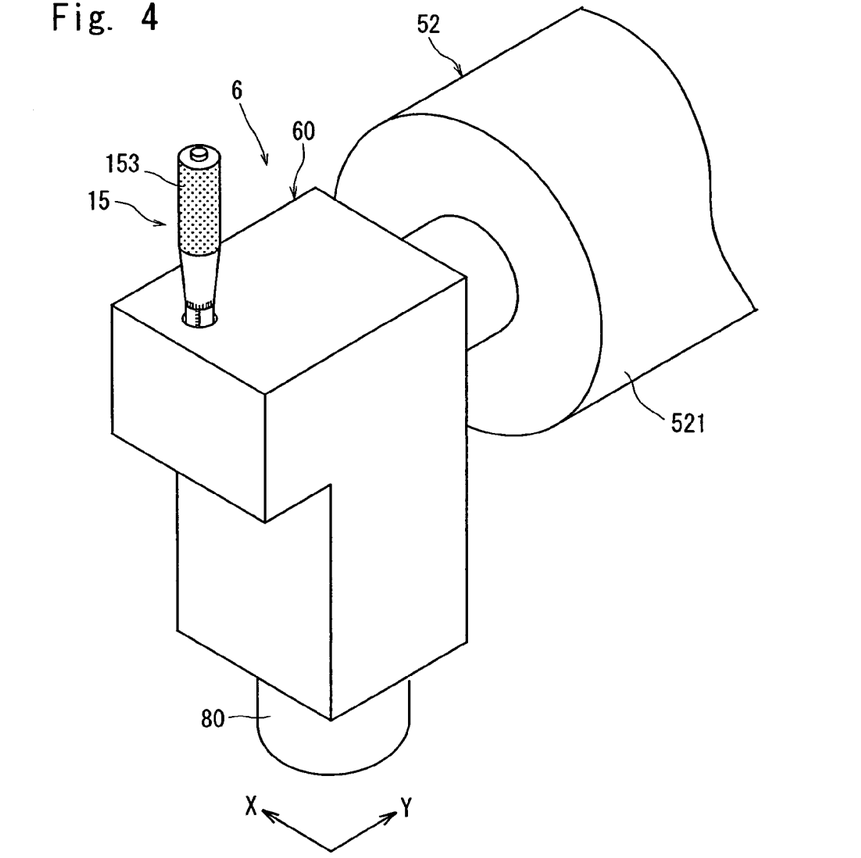
FIG. 4 is a perspective view of the processing head shown in FIG. 3.

The above processing head 6 is composed of a direction changing mirror 61 and a condenser 7, as shown in FIG. 3. The direction changing mirror 61 changes the direction of the pulse laser beam oscillated from the above pulse laser beam oscillation means 522 and irradiated through the transmission optical system 523 toward the condenser 7. The condenser 7 in the illustrated embodiment comprises a condenser lens 8 opposed to the workpiece held on the above chuck table 36, a cylindrical lens unit 9 arranged on the upstream side in the laser beam application direction of the condenser lens 8, that is, between the condenser lens 8 and the direction changing mirror 61, and an interval adjustment mechanism for adjusting the interval between the condenser lens 8 and the cylindrical lens unit 9, which will be described later. The above direction changing mirror 61, the cylindrical lens unit 9 and the interval adjustment mechanism later described are installed in a processing head housing 60 mounted on the end of the above casing 521, as shown in FIG. 4. The above condenser lens 8 is installed in a lens housing 80 attached to the bottom of the processing head housing 60. The focal distance of the condenser lens 8 is set to 40 mm in the illustrated embodiment. The above condenser lens 8, a cylindrical lens 91 and the interval adjustment mechanism function as an elliptic spot forming means for forming an elliptic focal spot as will be described later.

Figure 5:
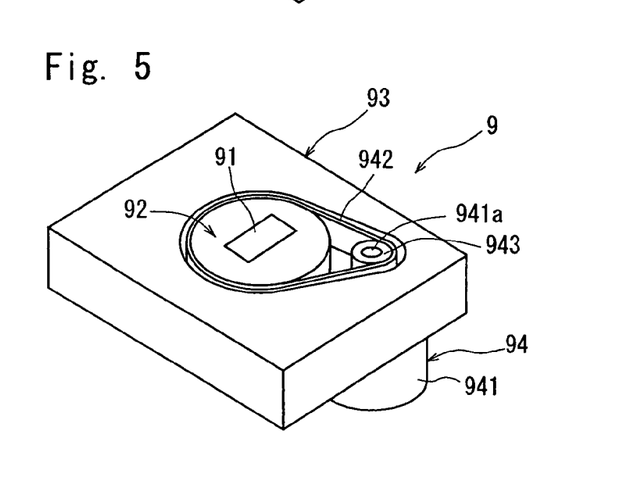
FIG. 5 is a perspective view of a cylindrical lens unit constituting the condenser of the processing head shown in FIG. 3.

A description is subsequently given of the above cylindrical lens unit 9 with reference to FIGS. 5 to 7. FIG. 5 is a perspective view of the cylindrical lens unit 9 and FIG. 6 is an exploded perspective view of the cylindrical lens unit 9 shown in FIG. 5.

Figure 6:
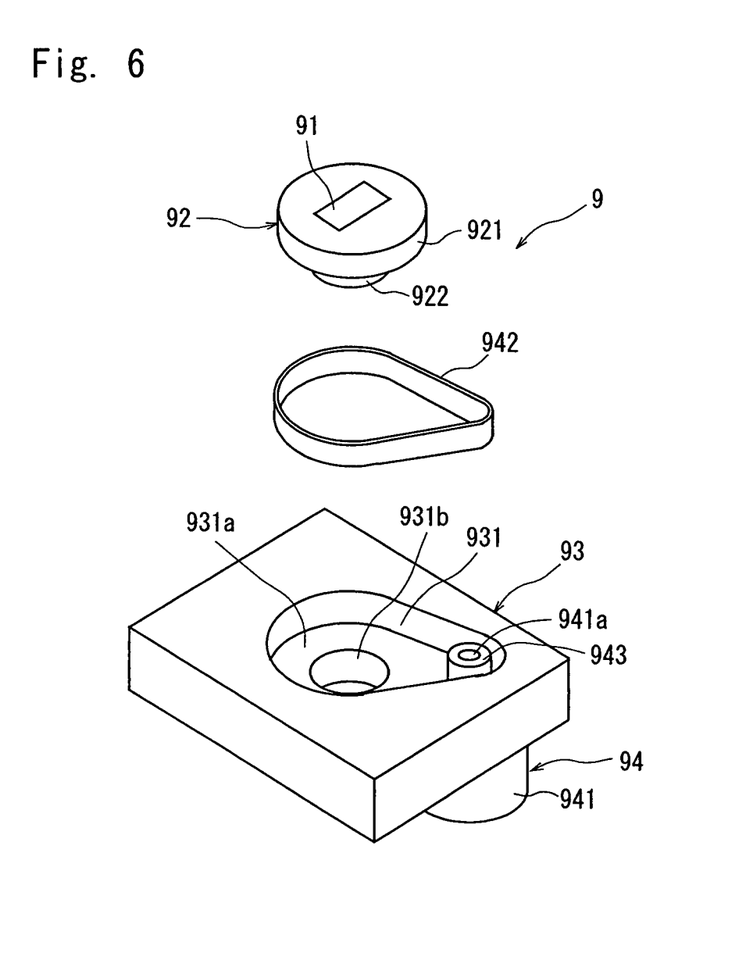
FIG. 6 is an exploded perspective view of the constituent member of the cylindrical lens unit shown in FIG. 5.

The cylindrical lens unit 9 shown in FIG. 5 and FIG. 6 comprises the cylindrical lens 91, a lens holding member 92 for holding the cylindrical lens 91, and a frame 93 for holding the lens holding member 92.

Figure 7:
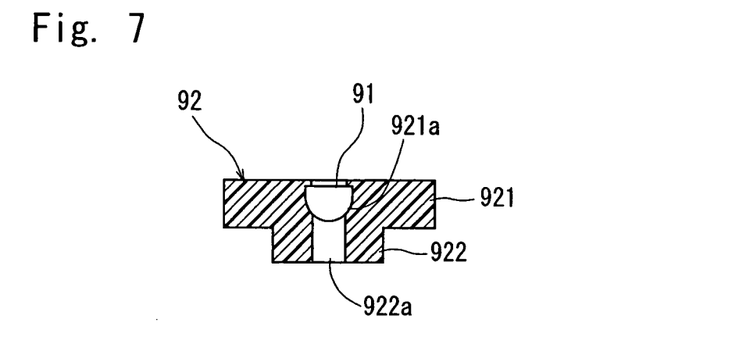
FIG. 7 is a sectional view of a lens holding member holding a cylindrical lens constituting the cylindrical lens unit shown in FIG. 5.

The cylindrical lens 91 is a convex lens having a semicircular section as shown in FIG. 7. The focal distance of this cylindrical lens 91 is set to 40 mm in the illustrated embodiment. The lens holding member 92 for holding the cylindrical lens 91 is circular and made of a synthetic resin in the illustrated embodiment. This lens holding member 92 consists of a lens holding portion 921 and a turning shaft portion 922 which projects from the center portion of the undersurface of the lens holding portion 921. A lens fitting hole 921*a* is formed in the lens holding portion 921, and the cylindrical lens 91 is fitted and held in this lens fitting hole 921*a*. A laser beam through-hole 922*a* communicating with the lens fitting hole 921*a* formed in the lens holding portion 921 is penetratingly formed in the turning shaft portion 922 in an axial direction.

The frame 93 for holding the above lens holding member 92 is rectangular as shown in FIG. 6, and a hollow 931 for accepting the lens holding portion 921 of the above lens holding member 92 is formed in the top surface of the frame 93. A shaft hole 931*b* to be turnably fitted to the turning shaft portion 922 of the above lens holding member 92 is formed in the bottom wall 931*a* of the hollow 931. The lens holding portion 921 of the above lens holding member 92 is set in the hollow 931 of the frame 93 constituted as described above, and the turning shaft portion 922 is fitted in the shaft hole 931*b* to arrange the lens holding portion 921 in such a manner that it can turn on the optical axis of the laser beam passing through the cylindrical lens 91 at the center thereof.

The cylindrical lens unit 9 in the illustrated embodiment has a lens turning means 94 for turning the above lens holding member 92 on the turning shaft portion 922 at the center thereof. The lens turning means 94 comprises a pulse motor 941 and an endless belt 942 in the illustrated embodiment. The pulse motor 941 is mounted on the undersurface of the above frame 93 and its drive shaft 941*a* projects into the hollow 931. A pulley 943 is fitted onto the drive shaft 941*a*, and the endless belt 942 is put round the pulley 943 and the outer periphery of the lens holding portion 921 of the above lens holding member 92. Therefore, by driving the pulse motor 941 in a normal direction or reverse direction, the lens holding member 92 is turned in one direction or the other direction by the pulley 943 and the endless belt 942 on the turning shaft portion 922 at the center thereof. This lens turning means 94 functions as a focal spot turning means for turning the elliptic focal spot formed by the elliptic spot forming means composed of the condenser lens 8, the cylindrical lens 91 and the interval adjustment mechanism 10 on the optical axis at the center thereof, as described later.

Figure 8:
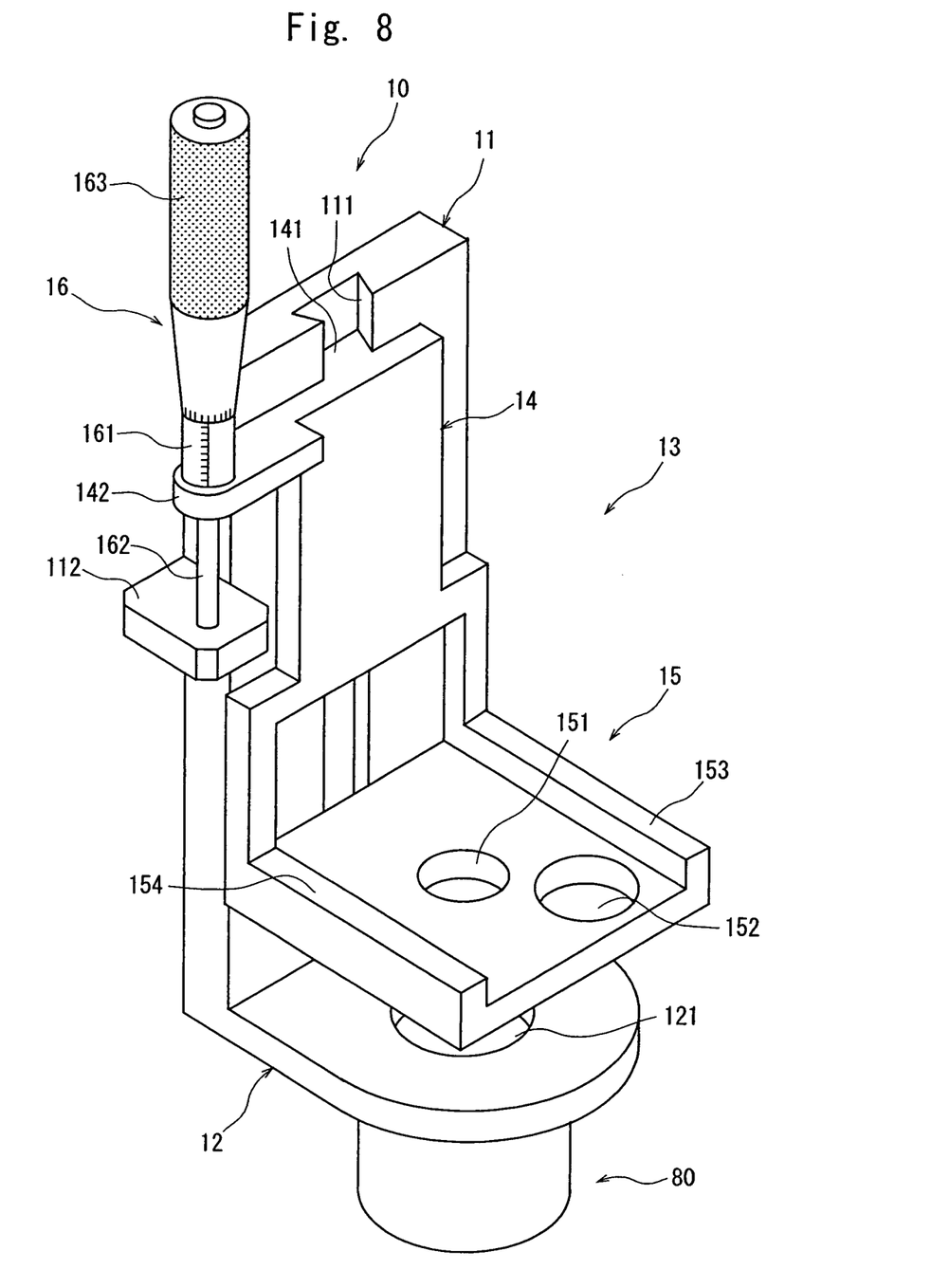
FIG. 8 is a perspective view of an interval adjustment mechanism for adjusting the interval between the condenser lens and the cylindrical lens unit provided in the laser beam processing machine shown in FIG. 1.

The cylindrical lens unit 9 constituted as described above is set in the interval adjustment mechanism 10 shown in FIG. 8. A description is subsequently given of the internal adjustment mechanism 10.

The interval adjustment mechanism 10 shown in FIG. 8 comprises a support board 11, a condenser lens support plate 12 installed at the lower end of the support board 11, and a support table 13 arranged such that it can move in the vertical direction along the foreface of the support board 11.

A guide groove 111 is formed in the center portion of the foreface of the support board 11 in the vertical direction. A first adjustment plate 112 is fixed to the intermediate portion of the side wall of the support board 11. The condenser lens support plate 12 projects from the foreface of the support board 11 at a right angle. A hole 121 is formed in the center portion of this condenser lens support plate 12. The lens housing 80 is mounted on the undersurface of the condenser lens support plate 12 constituted as described above in such a manner that the condenser lens 8 is situated at a position corresponding to the hole 121.

The above support table 13 is composed of a support portion 14 and a table portion 15 installed at the lower end of the support portion 14. The support portion 14 has, on the rear face, a to-be-guided rail 141 to be fitted to the guide groove 111 formed in the above support board 11. By fitting this to-be-guided rail 141 to the guide groove 111, the support table 13 is supported to the support board 11 in such a manner that it can move along the guide groove 111 in the vertical direction. A second adjustment plate 142 positioned above the first adjustment plate 112 is fixed to the upper end of the support portion 14. The above table portion 15 projects from the foreface of the support portion 14 at a right angle. A hole 151 through which a laser beam passes is formed in the center portion of this table portion 15 and a hole 152 for accepting the pulse motor 941 of the above lens turning means 94 is formed in the above table portion 15. Positioning rails 153 and 154 extending at a right angle from the foreface of the support board 11 are formed at both side ends of the table portion 15. The interval between the positioning rails 153 and 154 is set to a size corresponding to the width of the frame 93 constituting the above cylindrical lens unit 9.

An adjusting screw means 16 is fitted in the above second adjustment plate 142. This adjusting screw means 16 comprises a support cylinder 161 mounted on the second adjustment plate 142, a metering rod 162 installed in the support cylinder 161 in such a manner that it can move in the vertical direction, and an adjustment dial 163 for moving the metering rod 162 in the vertical direction and has the same structure as a micrometer. In the thus constituted adjusting screw means 16, the end (lower end) of the metering rod 162 is brought into contact with the top surface of the above first adjustment plate 112 to restrict the position in the vertical direction of the support portion 14 constituting the support table 13. Therefore, by moving the metering rod 162 in the vertical direction by turning the adjustment dial 163 in one direction or the other direction, the position in the vertical direction of the support portion 14, that is, the interval between the table portion 15 installed at the lower end of the support portion 14 and the condenser lens support plate 12 can be changed. At this point, the interval between the table portion 15 of the support table 13 and the condenser lens support plate 12 can be suitably adjusted by adjusting the moving distance of the metering rod 162 based on a scale formed on the support cylinder 161 and the adjustment dial 163.

Figure 9:
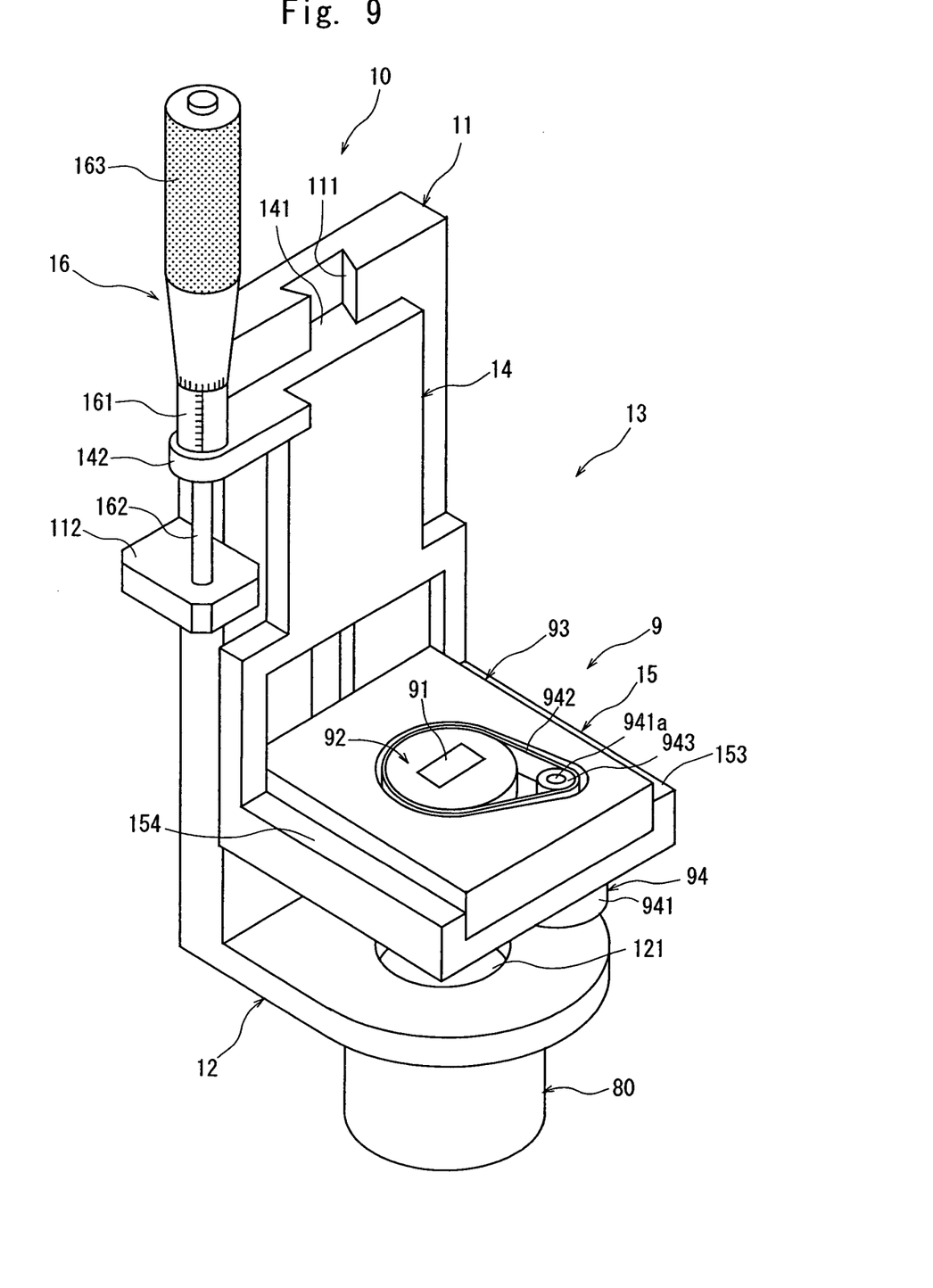
FIG. 9 is a perspective view showing a state of the interval adjustment mechanism shown in FIG. 8 in which the cylindrical lens unit is set.

As shown in FIG. 9, the above cylindrical lens unit 9 is set on the table portion 15 constituting the support table 13 of the interval adjustment mechanism 10 constituted as described above. That is, the frame 93 of the cylindrical lens unit 9 is placed between the positioning rails 153 and 154 of the table portion 15 constituting the support table 13. The cylindrical lens unit 9 placed at a predetermined position on the table portion 15 of the support table 13 is fixed on the table portion 15 of the support table 13 by a suitable fixing means that is not shown. The converging direction of the cylindrical lens 91 of the cylindrical lens unit 9 thus arranged on the table portion 15 of the support table 13 is set to the processing-feed direction indicated by the arrow X in FIG. 9.

Returning to FIG. 1, an image pick-up means 17 for detecting the area to be processed by the above laser beam application means 52 is mounted on the anterior end portion of the casing 521 constituting the above laser beam application means 52. This image pick-up means 17 is constituted by an image pick-up device (CCD) etc., and supplies an image signal to the control means 20.

The control means 20 is composed of a computer which comprises a central processing unit (CPU) 201 for carrying out arithmetic processing based on a control program, a read-only memory (ROM) 202 for storing the control programs etc., a read/write random access memory (RAM) 203 for storing data on the design values of the workpiece and the results of operations both of which will be described later, a counter 204, an input interface 205 and an output interface 206. Detection signals from the above processing-feed amount detection means 374, indexing-feed amount detection means 384, image pick-up means 17, and the like are input to the input interface 205 of the control means 20. Control signals are output from the output interface 206 of the control means 20 to the above pulse motor 372, pulse motor 382, pulse motor 432, pulse motor 532, laser beam application means 52, pulse motor 941, and the like. The above random access memory (RAM) 203 has a first storage area 203*a* for storing data on the design values of the processing line formed on the workpiece which will be described later, a second storage area 203*b* for storing data on the detection values which will be described later, and other storage area.

The laser beam processing machine in the illustrated embodiment is constituted as described above, and its function will be described hereinunder.

The shape of the focal spot of a laser beam applied by the above-described laser beam application means 52 will be described with reference to FIGS. 10(*a*) to 10(*c*) and FIGS. 11(*a*) to 11(*c*).

Figure 10:
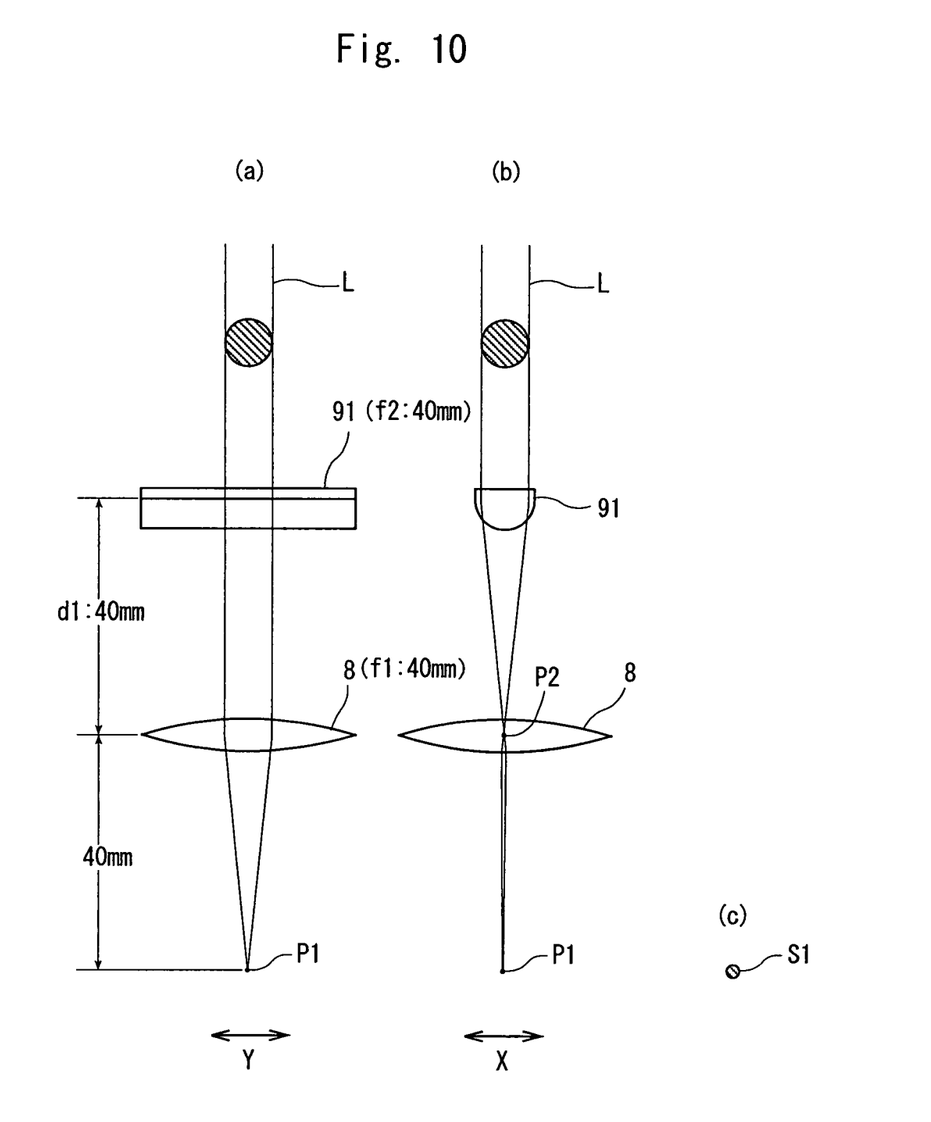
FIGS. 10(a) to 10(c) are explanatory diagrams showing that a focal spot having a circular section is formed by the condenser lens and the cylindrical lens which is a convex lens.

A description is first given of a case where the interval (d1) between the cylindrical lens 91 and the condenser lens 8 is set to 40 mm which is the same as the focal distance (f2) of the cylindrical lens 91 as shown in FIGS. 10(*a*) and 10(*b*). In this case, the laser beam L is converged in the Y direction not by the cylindrical lens 91 but only by the condenser lens 8. That is, as shown in FIG. 10(*a*), the laser beam L passing through the cylindrical lens 91 is focused at a focal point (P1) 40 mm below the condenser lens 8, which is the focal distance (f1) of the condenser lens 8.

Meanwhile, the laser beam L is converged in the X direction by the cylindrical lens 91. That is, since the focal distance (f2) of the cylindrical lens 91 is set to 40 mm, the focal point P2 of the laser beam L focused in the X direction by the cylindrical lens 91 is existent at the center position of the condenser lens 8 as shown in FIG. 10(*b*). The laser beam L focused at the center position of the condenser lens 8 expands toward the undersurface of the condenser lens 8 and focused again at the above focal point P1 from the undersurface of the condenser lens 8. When the interval (d1) between the cylindrical lens 91 and the condenser lens 8 is made the same as the focal distance (f2) of the cylindrical lens 91, the laser beam L having a circular section incoming into the cylindrical lens 91 is converged in the X direction by the cylindrical lens 91 and in the Y direction by the condenser lens 8, whereby a focal spot S1 having a circular section shown in the enlarged view of FIG. 10(*c*) is formed at the focal point P1. Therefore, when the workpiece is placed at the position of the focal point P1, it can be processed by means of the focal spot S1 having a circular section.

Figure 11:
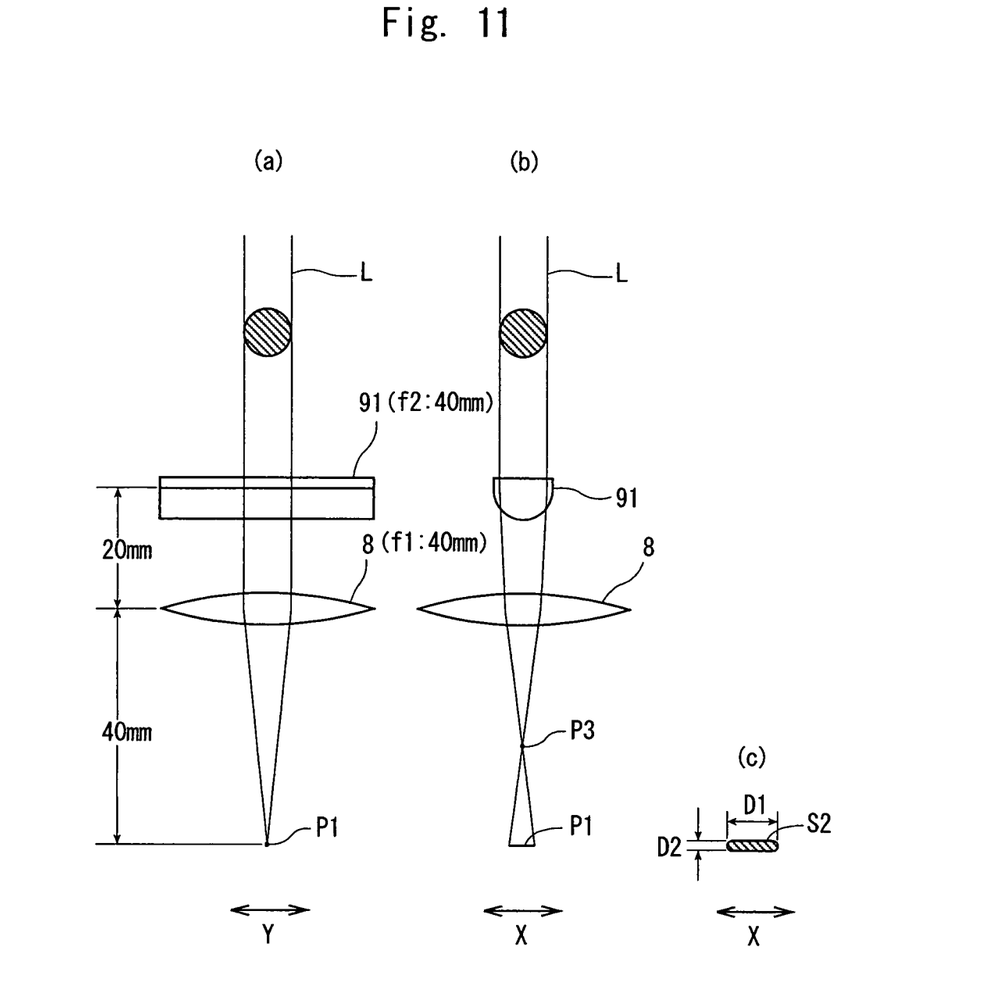
FIGS. 11(a) to 11(c) are explanatory diagrams showing that a focal spot having an elliptic section is formed by the condenser lens and the cylindrical lens which is a convex lens.

A description is subsequently given of a case where the interval (d1) between the cylindrical lens 91 and the condenser lens 8 is set to 20 mm which is half of the focal distance (f2) of the cylindrical lens 91 as shown in FIGS. 11(*a*) and 11(*b*). Also in this case, the laser beam L is converged in the Y direction not by the cylindrical lens 91 but only by the condenser lens 8. That is, as shown in FIG. 11(*a*), the laser beam L passing through the cylindrical lens 91 is focused at the focal point (P1) 40 mm below the condenser lens 8, which is the focal distance (f1) of the condenser lens 8.

Meanwhile, since the focal distance (f2) of the cylindrical lens 91 is set to 40 mm, the laser beam L which is converged in the X direction by the cylindrical lens 91 as shown in FIG. 11(*b*) enters into the condenser lens 8 before it is focused, further converged by the condenser lens 8 to be focused at a focal point P3 and then, expanded in the X direction until it reaches the workpiece. As a result, at the position of the focal point P1, a focal spot S2 having an elliptic section is formed as shown in the enlarged view of FIG. 11(*c*). The long axis D1 of the focal spot S2 having an elliptic section is formed in the direction indicated by the arrow X. The ratio of the long axis D1 to the short axis D2 of the focal spot S2 having an elliptic section can be adjusted by changing the interval (d1) between the condenser lens 8 and the cylindrical lens 91. Therefore, when the workpiece is placed at the position of the focal point P1, it can be processed by means of the focal spot S2 having an elliptic section.

A description is subsequently given of a case where the cylindrical lens 91 constituting the above cylindrical lens unit 9 is a concave lens with reference to FIGS. 12(*a*) to 12(*c*). In this case, the focal distance (f2) of the cylindrical lens 91 which is a concave lens is set to −40 mm and the interval (d1) between the cylindrical lens 91 and the condenser lens 8 is set to 20 mm.

Also in this case, the laser beam L is converged in the Y direction not by the cylindrical lens 91 but only by the condenser lens 8. That is, as shown in FIG. 12(*a*), the laser beam L passing through the cylindrical lens 91 is focused at the focal point (P1) 40 mm below the condenser lens 8, which is the focal distance (f1) of the condenser lens 8.

Figure 12:
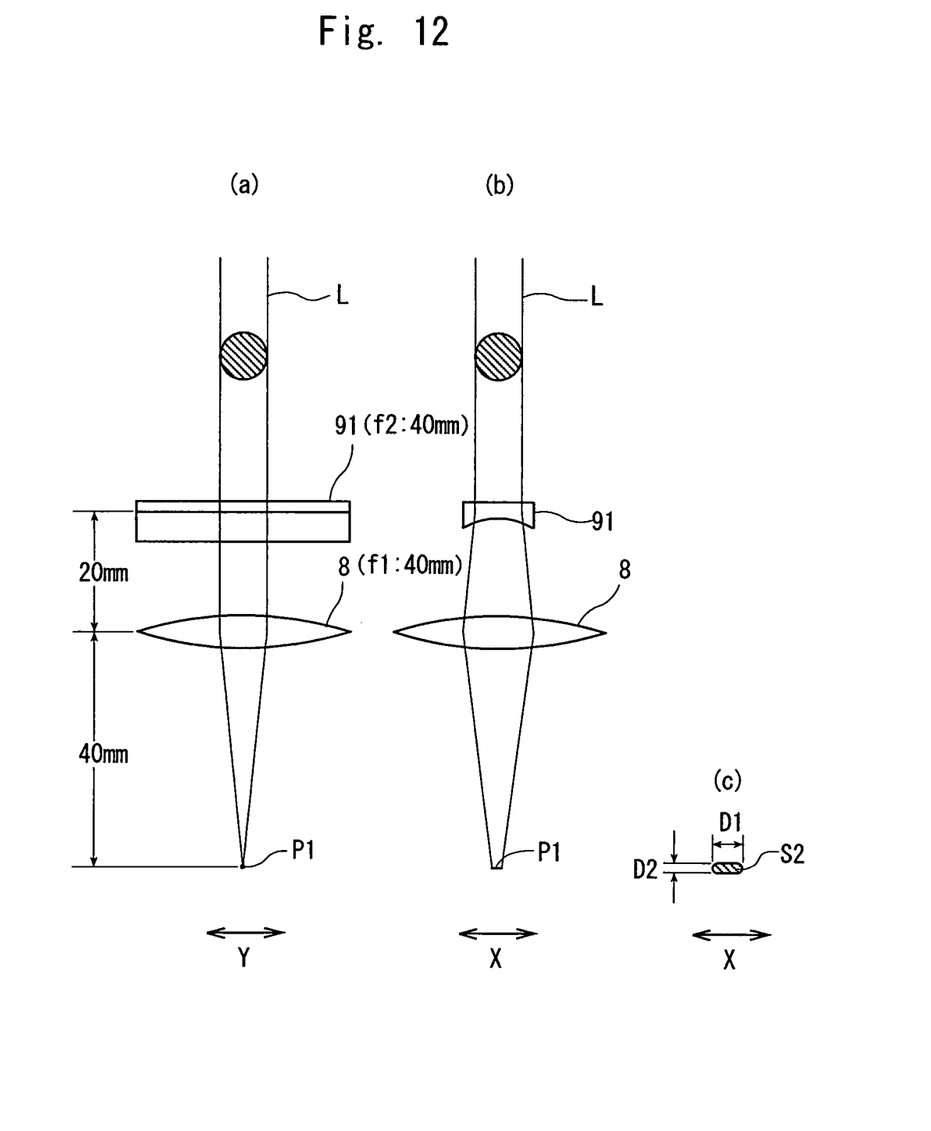
FIGS. 12(a) to 12(c) are explanatory diagrams showing that a focal spot having an elliptic section is formed by the condenser lens and the cylindrical lens which is a concave lens.

Meanwhile, since the focal distance (f2) of the cylindrical lens 91 which is a concave lens is set to −40 mm, the laser beam L diverged in the X direction by the cylindrical lens 91 is converged by the condenser lens 8 as shown in FIG. 12(*b*). However, the laser beam reaches the above focal point (P1) which is the focal distance (f1) of the condenser lens 8 before it is focused by the condenser lens 8 as it is diverged in the X direction by the cylindrical lens 91. As a result, at the position of the focal point (P1) which is the focal distance (f1) of the condenser lens 8, a focal spot S2 having an elliptic section is formed as shown in the enlarged view of FIG. 12(*c*). The long axis D1 of this focal spot S2 having an elliptic section is formed in the direction indicated by the arrow X. The ratio of the long axis D1 to the short axis D2 of the focal spot S2 having an elliptic section can be adjusted by changing the interval (d1) between the condenser lens 8 and the cylindrical lens 91. Therefore, when the workpiece is placed at the position of the focal point P1, it can be processed by means of the focal spot S2 having an elliptic section.

The condenser lens 8, the cylindrical lens 91 and the interval adjustment mechanism 10 for adjusting the interval (d1) between the condenser lens 8 and the cylindrical lens 91 function as an elliptic spot forming means for forming an elliptic focal spot. The lens turning means 94 for turning the above lens holding member 92 on the turning shaft portion 922 as the center thereof functions as a focal spot turning means for turning the elliptic focal spot formed by the elliptic spot forming means on the optical axis as at the center thereof, as will be described later.

A description is subsequently given of a processing method for forming a groove in the workpiece by means of the focal spot S2 having an elliptic section shown in FIGS. 11(a) to 11(c) and FIGS. 12(a) to 12(c).

Figure 13:
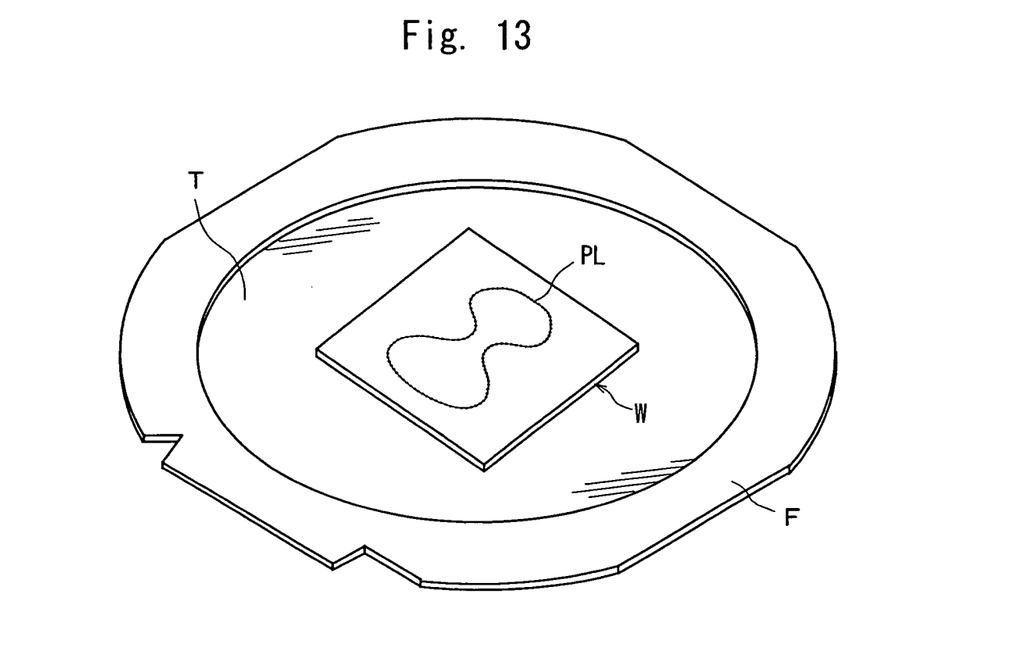
FIG. 13 is a perspective view of a workpiece to be processed by the laser beam processing machine shown in FIG. 1 put on the surface of a protective tape affixed to an annular frame.

FIG. 13 shows a state where the workpiece W is put on the surface of a protective tape T mounted on an annular frame F. A processing line PL which is a curved line is formed on the front surface of the workpiece W. The processing line PL formed on the front surface of the workpiece W is divided into a1 to an, and data on the X, Y coordinate values of a1 to an are stored in the first storage area 203a of the random access memory (RAM) 203 of the above control means 20.

As shown in FIG. 13, the protective tape T side of the workpiece W supported to the annular frame F through the protective tape T is first placed on the chuck table 36 of the laser beam processing machine shown in FIG. 1. The workpiece W is suction-held on the chuck table 36 through the protective tape T by activating a suction means that is not shown. The annular frame F is fixed by the clamps 362. The chuck table 36 suction-holding the workpiece W is brought to a position right below the image pick-up means 17 by the processing-feed means 37. After the chuck table 36 is positioned right below the image pick-up means 17, the workpiece W on the chuck table 36 is at the coordinate position shown in FIG. 14.

Figure 14:
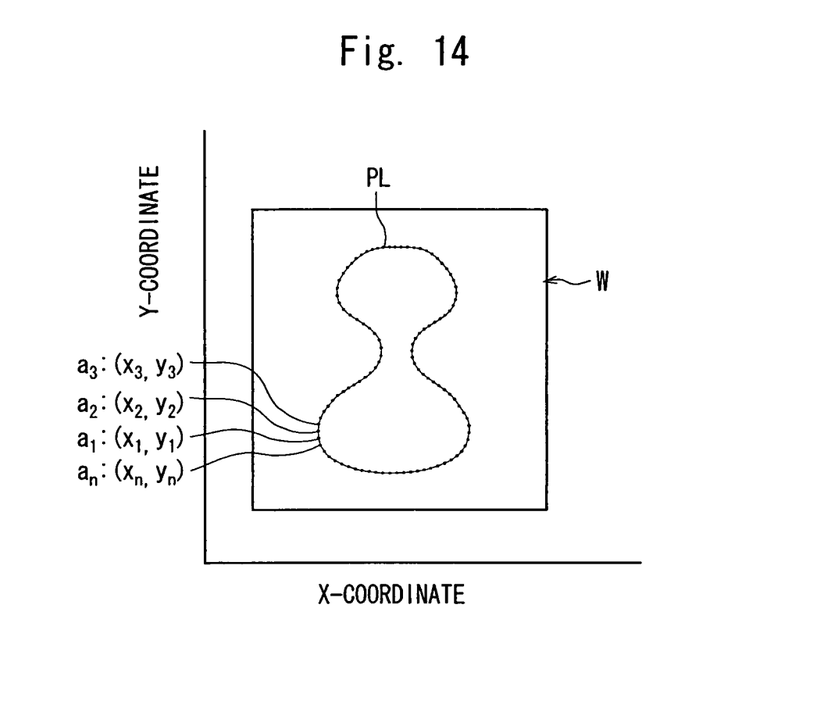
FIG. 14 is an explanatory diagram showing the relationship between the workpiece shown in FIG. 13 and coordinates in a state where the workpiece is held at a predetermined position of the chuck table of the laser beam processing machine shown in FIG. 1.

A processing start position, for example, a position a1 is detected by the image pick-up means 17 and the control means 20. The chuck table 36 is moved to locate the position a1 right below (processing position) the condenser 7 of the laser beam application means 52. Thereafter, the control means 20 obtains an inclination (θ) from the current position a1 to the next to-be-processed position a2. That is, when the coordinate values of the position a1 are (x1, y1) and the coordinate values of the position a2 are (x2, y2), the inclination (θ) with respect to the X-axis direction from the current position a1 to the next to-be-processed position a2 is obtained from the equation θ=(y1−y2)/x1−x2). After the inclination (θ) with respect to the X-axis direction from the current position a1 to the next to-be-processed position a2 is obtained, the control means 20 controls the pulse motor 941 of the above lens turning means 94 to ensure that the long axis D1 of the elliptic focal spot 2 should coincide with the inclination (θ) with respect to the X-axis direction. Then, the control means 20 controls the laser beam application means 52 to apply a pulse laser beam of a wavelength having absorptivity for the workpiece W from the condenser 7 and controls the processing-feed means 37 and the indexing-feed means 38 to move the chuck table 36 so as to locate the next to-be-processed position a2 right below the condenser 7. For the movement of the chuck table 36, the control means 20 controls the pulse motor 372 of the processing-feed means 37 and the pulse motor 384 of the indexing-feed means 38 based on data on the X, Y coordinate values of a1 to an of the processing line PL formed on the front surface of the workpiece W stored in the first storage area 203a of the random access memory (RAM) 203 and detection signals from the processing-feed amount detection means 374 and the indexing-feed amount detection means 384.

After the laser beam is irradiated from the position a1 to the position a2 as described above, the control means 20 obtains an inclination (α) with respect to the X-axis direction from the position a2 to the position a3 as described above and controls the pulse motor 941 of the above lens turning means 94 to ensure that the long axis D1 of the elliptic focal spot S2 should coincide with the inclination (α) with respect to the X-axis direction and controls the processing-feed means 37 and the indexing-feed means 38 to move the chuck table 36 so as to locate the next to-be-processed position a3 right below the condenser 7. The control means 20 carries out the above operation until the position a1 is reached through the position an. As a result, grooves having a width corresponding to the short axis D2 of the focal spot S2 are formed along the processing line PL in the workpiece W.

The conditions of the above laser processing are set as follows, for example.
Light source of laser beam: YVO4 laser or YAG laser
Wavelength: 355 nm
Repetition frequency: 50 kHz
Average output: 4 W
Focal spot: elliptic, long axis (D1) of 200 μm, short axis (D2) of 10 μm Since laser processing is carried out while the lens holding member 92 holding the cylindrical lens 91 is turned to ensure that the long axis D1 of the elliptic focal spot S2 is applied along the processing line PL in the laser beam processing machine in the illustrated embodiment, even when the processing line PL is curved, grooves having a width corresponding to the short axis D2 of the focal spot S2 can be formed along the processing line PL in the workpiece W.

What is claimed is:

1. A laser beam processing machine comprising:
a chuck table for holding a workpiece, a laser beam application means for applying a laser beam to the workpiece held on the chuck table, a processing-feed means for moving the chuck table and the laser beam application means relative to each other in a processing-feed direction, an indexing-feed means for moving the chuck table and the laser beam application means relative to each other in an indexing-feed direction perpendicular to the processing-feed direction, a processing-feed amount detection means for detecting the processing-feed amount fed by the processing-feed means, an indexing-feed amount detection means for detecting the indexing-feed amount fed by the indexing-feed means, and a control means for controlling the laser beam application means, the processing-feed means and the indexing-feed means based on detection signals from the processing-feed amount detection means and the indexing-feed amount detection means, wherein
the laser beam application means comprises a laser beam oscillating means for oscillating a laser beam and a condenser for converging the laser beam oscillated by the laser beam oscillating means,
the condenser comprises a condenser lens, an elliptic spot forming means for forming a focal spot into an elliptic shape, and a focal spot turning means for turning the elliptic focal spot formed by the elliptic spot forming means on an optical axis at the center thereof,
the elliptic spot forming means comprises a cylindrical lens arranged on an upstream side in a laser beam application direction of the condenser lens, and an interval adjusting mechanism for adjusting a ratio of a long axis to a short axis of the elliptic focal spot by changing the interval between the condenser lens and the cylindrical lens,
the interval adjustment mechanism comprises a vertical support board and a support table arranged such that it can move in the vertical direction along a foreface of the support board,
the support board has a condenser lens support plate that supports the condenser lens and projects from the foreface of the support board at a right angle,
the support table has a support portion and a table portion that is provided with the cylindrical lens, the table portion being disposed at a lower end of the support portion and above the condenser lens support plate, the support board and the support portion are provided with adjusting screw means for adjusting an interval between the condenser lens support plate and the table portion, a frame with a lens holding member in which the cylindrical lens is fitted and held is provided on the table portion, the frame has a hollow for containing the lens holding member and a shaft hole formed in a bottom wall of the hollow, the focal spot turning means includes a pulse motor with a turning shaft portion received within the shaft hole of the frame and an endless belt that connects the lens holding member to the motor's turning shaft for turning of the cylindrical lens, the control means comprises a storage means for storing X, Y coordinate values of a curved processing line formed on the workpiece, and the control means obtains X, Y coordinate values of the current position of a laser beam application position based on detection signals from the processing-feed amount detection means and the indexing-feed amount detection means, and controls the focal spot turning means so that a long axis of the focal spot follows along the curved processing line based on the X, Y coordinate values of the detected current position and the X, Y coordinate values of the processing line stored in the storage means.

2. The laser beam processing machine according to claim 1, wherein when the X, Y coordinate values of the current position of the laser beam application position are x1, y1 and coordinate values of a next to-be-processed position are x2, y2, the control means obtains an inclination $\theta$ with respect to the X-axis direction from the current position to the next to-be-processed position based on an equation $\theta=y1-y2/x1-x2$ and controls the focal spot turning means so that the long axis of the focal spot coincides with the inclination $\theta$ with respect to the X-axis direction.

* * * * *